United States Patent
Park et al.

(10) Patent No.: US 10,869,308 B2
(45) Date of Patent: Dec. 15, 2020

(54) APPARATUS AND METHOD FOR ALLOCATING RESOURCES IN WIRELESS COMMUNICATION SYSTEM

(71) Applicant: SAMSUNG ELECTRONICS CO., LTD., Suwon-si (KR)

(72) Inventors: Hyoyol Park, Suwon-si (KR); Eunyong Kim, Suwon-si (KR); Yunseok Choi, Suwon-si (KR)

(73) Assignee: SAMSUNG ELECTRONICS CO.. LTD., Suwon-si (KR)

( * ) Notice: Subject to any disclaimer, the term of this patent is extended or adjusted under 35 U.S.C. 154(b) by 36 days.

(21) Appl. No.: 16/239,738

(22) Filed: Jan. 4, 2019

(65) Prior Publication Data
US 2019/0208510 A1    Jul. 4, 2019

(30) Foreign Application Priority Data

Jan. 4, 2018    (KR) .................. 10-2018-0001200

(51) Int. Cl.
*H04W 4/00*    (2018.01)
*H04W 72/04*    (2009.01)
(Continued)

(52) U.S. Cl.
CPC ......... *H04W 72/044* (2013.01); *H04L 1/0003* (2013.01); *H04L 1/0009* (2013.01);
(Continued)

(58) Field of Classification Search
CPC . H04W 72/044; H04W 52/006; H04W 52/34; H04L 1/0003; H04L 1/0009; H04L 5/0044; H04L 5/006
See application file for complete search history.

(56) References Cited

U.S. PATENT DOCUMENTS

2005/0032514 A1*    2/2005  Sadri ................... H04W 52/346
                                                      455/423
2006/0023624 A1    2/2006  Han et al.
(Continued)

FOREIGN PATENT DOCUMENTS

KR    10-2014-0134207 A    11/2014

OTHER PUBLICATIONS

Kun Wang et al., "Energy-Efficiency of LTE for Small Data Machine-to Machine Communications", 2013 IEEE International Conference on Communications (ICC), IEEE, XP032522713, Jun. 9, 2013, pp. 4120-4124.
(Continued)

*Primary Examiner* — Abdelnabi O Musa
(74) *Attorney, Agent, or Firm* — Sughrue Mion, PLLC

(57) ABSTRACT

A pre-5th-Generation (5G) or 5G communication system is provided for supporting higher data rates than in 4th-Generation system. An apparatus of a base station includes: at least one transceiver and at least one processor operatively connected to the transceiver. The transceiver receives channel quality information from a terminal. The processor obtains a first modulation and coding scheme (MCS) level and a number of first resource blocks based on the channel quality information, determines a power boosting value for applying a second MCS level indicating a higher modulation order or a higher code rate than the first MCS level, obtains, based on the power boosting value, a number of second resource blocks corresponding to a transport block size (TBS) value greater than a TBS value corresponding to the number of the first resource blocks in the first MCS level and transmits downlink data based on these determinations.

18 Claims, 11 Drawing Sheets

(51) Int. Cl.
    *H04L 1/18*           (2006.01)
    *H04L 1/00*           (2006.01)
    *H04L 5/00*           (2006.01)
    *H04W 52/34*         (2009.01)

(52) U.S. Cl.
    CPC .......... *H04L 1/0015* (2013.01); *H04L 1/0033* (2013.01); *H04L 1/1812* (2013.01); *H04L 5/006* (2013.01); *H04L 5/0044* (2013.01); *H04W 52/34* (2013.01); *H04L 5/0055* (2013.01); *H04L 5/0057* (2013.01)

(56) References Cited

U.S. PATENT DOCUMENTS

| | | | |
|---|---|---|---|
| 2015/0195737 A1* | 7/2015 | Tabet | H04L 43/0888 |
| | | | 455/405 |
| 2019/0045390 A1* | 2/2019 | Davydov | H04W 28/0273 |
| 2019/0150132 A1* | 5/2019 | Bala | H04W 72/042 |
| | | | 370/329 |
| 2019/0280802 A1* | 9/2019 | Ma | H04W 76/11 |

OTHER PUBLICATIONS

Communication dated May 29, 2019, issued by the European Patent Office in counterpart European Application No. 19150319.2.

* cited by examiner

APPARATUS AND METHOD FOR ALLOCATING RESOURCES IN WIRELESS COMMUNICATION SYSTEM

CROSS-REFERENCE TO RELATED APPLICATION(S)

This application is based on and claims priority under 35 U.S.C. § 119 to Korean Patent Application No. 10-2018-0001200, filed on Jan. 4, 2018, in the Korean Intellectual Property Office, the disclosure of which is incorporated by reference herein in its entirety.

BACKGROUND

1. Field

The disclosure relates to a wireless communication system and, more particularly, to an apparatus and a method for allocating resources in a wireless communication system.

2. Description of Related Art

The above information is presented as background information only to assist with an understanding of the disclosure. No determination has been made, and no assertion is made, as to whether any of the above might be applicable as prior art with regard to the present disclosure.

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Since levels of data rates are not subdivided at a low modulation code rate level due to the characteristics of a 5G communication system aiming at a high data rate, the deviation of the data rates between the terminals located at the cell boundary may become large. Even in the case of the channel quality between two modulation code rate levels, since the data rate corresponding to a low modulation code rate level is always applied, the terminal may not be provided with an optimal throughput.

SUMMARY

Provided are an apparatus and a method for performing power boosting to increase the modulation code rate level in a wireless communication system.

In addition, provided is an apparatus and a method for allocating resources to data based on power boosting to provide an optimal throughput in a wireless communication system.

According to an aspect of the disclosure, an apparatus of a base station in a wireless communication system is provided and includes: at least one transceiver; and at least one processor operatively connected to the at least one transceiver. The at least one transceiver is configured to receive channel quality information from a terminal. The at least one processor is configured to: obtain a first modulation and coding scheme (MCS) level and a number of first resource blocks on the basis of the channel quality information, determine a power boosting value for applying a second MCS level indicating a higher modulation order or a higher code rate than the first MCS level, obtain, on the basis of the power boosting value, a number of second resource blocks corresponding to a transport block size (TBS) value greater than a TBS value according to the first MCS level and the number of the first resource blocks; and transmit downlink data to the terminal on the basis of the second MCS level and the second resource blocks.

According to yet another aspect of the disclosure, a method of operating a base station in a wireless communication system is provided and includes: receiving channel quality information from a terminal, obtaining a first MCS level and a number of first resource blocks on the basis of the channel quality information, determining a power boosting value for applying a second MCS level indicating a higher modulation order or a higher code rate than the first MCS level, obtaining, on the basis of the power boosting value, a number of second resource blocks corresponding to a TBS value greater than a TBS value according to the first MCS level and the number of the first resource blocks, and transmitting downlink data to the terminal on the basis of the second MCS level and the second resource blocks.

Embodiments of the disclosure can transmit a larger amount of data by performing power boosting in order to increase the modulation code rate level.

Additional aspects will be set forth in part in the description which follows and in part, will be apparent from the description, or may be learned by practice of the presented embodiments.

BRIEF DESCRIPTION OF THE DRAWINGS

The above and other aspects, features, and advantages, of certain embodiments of the present disclosure will be more apparent from the following description taken in conjunction with the accompanying drawings, in which.

DETAILED DESCRIPTION

The terms used in the present disclosure are only used to describe specific embodiments, and are not intended to limit the present disclosure. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

Hereinafter, various embodiments of the present disclosure will be described based on an approach of hardware. However, various embodiments of the present disclosure include a technology that uses both hardware and software and thus, the various embodiments of the present disclosure may not exclude the perspective of software.

The present disclosure relates to an apparatus and a method for controlling power in a wireless communication system, thereby increasing throughput. Specifically, the present disclosure describes techniques for power control, modulation scheme, code rate determination, and allocation of resource blocks in order to increase the data rate in a wireless communication system.

Hereinafter, terms indicating variables related to resources (e.g., a resource block, a transport block size, and the like), terms related to scheduling (e.g., resource block allocation, modulation scheme determination, code rate determination, and the like), terms indicting network entities, terms indicating components of an apparatus (e.g., a scheduler, a determiner, and the like), and the like are used as illustrative examples for convenience of explanation. Accordingly, the present disclosure is not limited to the following terms, and other terms technically equivalent thereto may be used.

In addition, although the present disclosure describes various embodiments using terms used in some communication standards (e.g., 3rd Generation Partnership Project (3GPP)), these are merely illustrative examples. The various embodiments of the present disclosure may be easily modified to be applied to other communication systems.

Figure 1:
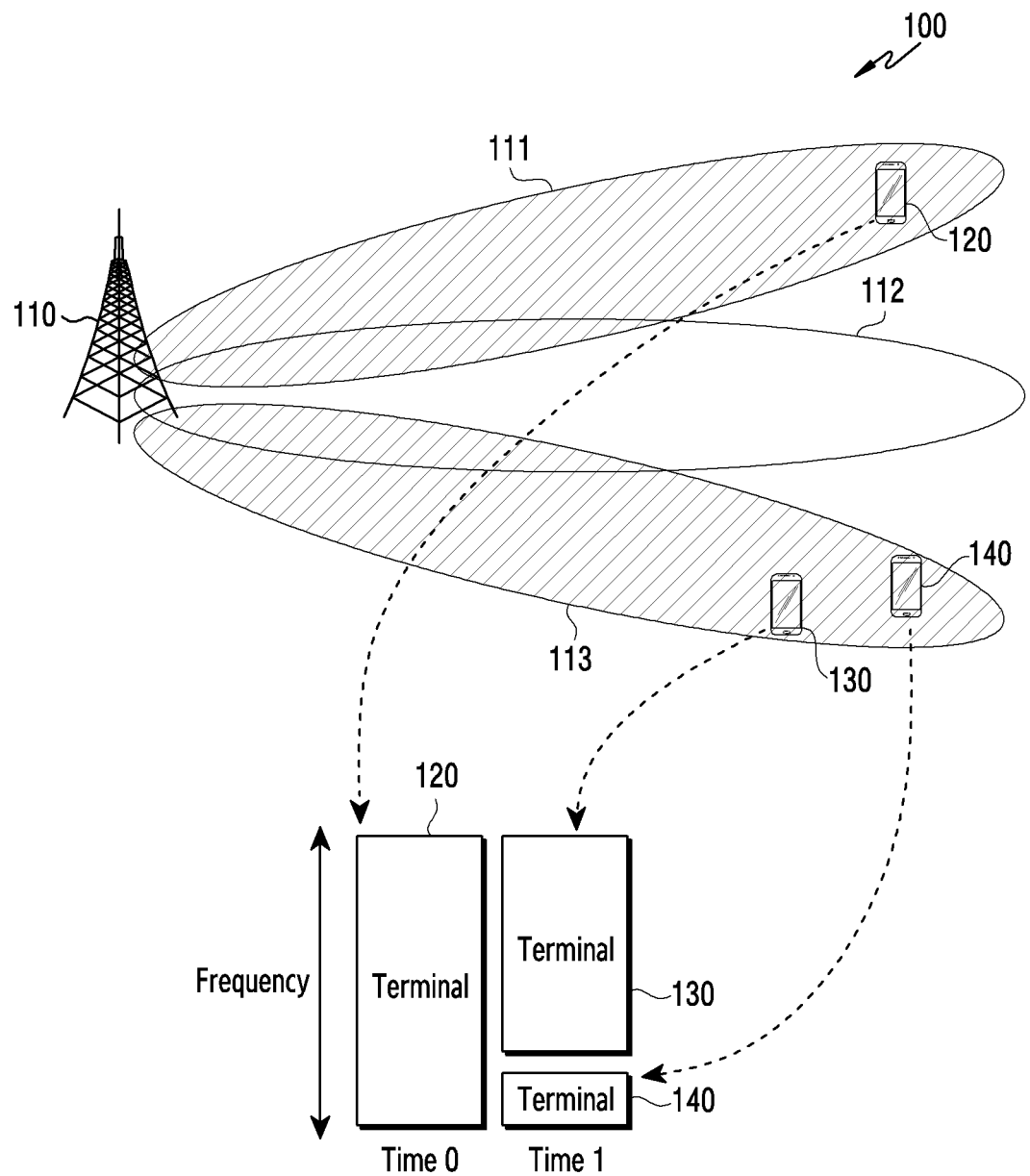
FIG. 1 is a view illustrating a wireless communication system according to various embodiments.

FIG. 1 is a view illustrating a wireless communication system according to various embodiments. FIG. 1 illustrates, as parts of nodes using a wireless channel in a wireless communication system, a base station 110, a terminal 120, a terminal 130, and a terminal 140.

The base station 110 is a network infrastructure that provides the terminals 120, 130, and 140 with wireless access. The base station 110 has a coverage defined as a specific geographic area on the basis of the distance in which the base station can transmit signals. The base station 110 may also be referred to as an "access point (AP)", an "eNodeB (eNB)", a "5G generation node (5G node)", a "wireless point", or other terms technically equivalent thereto. According to various embodiments, the base station 110 may be connected to one or more "transmission/reception points (TRPs)". The base station 110 may transmit downlink signals to, or may receive uplink signals from, the terminal 120, the terminal 130, or the terminal 140 through one or more TRPs.

Each of the terminal 120, the terminal 130, and the terminal 140 is a device used by a user and communicates with the base station 110 through a wireless channel. In some cases, at least one of: the terminal 120, the terminal 130, and the terminal 140 may be operated without user involvement. That is, at least one of the terminal 120, the terminal 130, and the terminal 140 is a device that performs machine type communication (MTC), and may not be carried by a user. Each of the terminal 120, the terminal 130, and the terminal 140 may also be referred to as "user equipment (UE)", a "mobile station", a "subscriber station", "customer premises equipment (CPE)", a "remote terminal", a "wireless terminal", an "electronic device", a "user device", or other terms technically equivalent thereto.

The base station 110, the terminal 120, the terminal 130, and the terminal 140 may transmit and receive wireless signals in millimeter wave (mmWave) bands (e.g., 28 GHz, 30 GHz, 38 GHz, and 60 GHz). Since the communication system using a millimeter wave results in a high path loss, the base station 110, the terminal 120, the terminal 130, and the terminal 140 may perform beamforming through a plurality of analog beams in order to overcome the problem and in order to improve channel gain. Here, the beamforming may include transmission beamforming and reception beamforming. That is, the base station 110, the terminal 120, the terminal 130, and the terminal 140 may assign directivity to the transmission signal or the reception signal. To this end, the base station 110 and the terminals 120, 130, and 140 may select serving beams through a beam search or a beam management procedure. After the serving beams are selected, subsequent communication may be performed via resources in a quasi-co-located (QCL) relationship with the resources that transmitted the serving beams. For example, the base station 110 may identify the serving beam through a beam search or a beam management procedure, among the beams 111, 112, and 113. The base station 110 may communicate with the terminal 120 using the serving beam 111. The base station 110 may communicate with the terminal 130 and the terminal 140 using the serving beam 113.

As a frequency band used in a wireless communication system increases, a narrow beam, rather than a relatively wide beam, is used in the wireless communication system. The base station divides resources by time to perform beam-based scheduling, so that there is a high probability that a single beam is used for a single terminal for a specific time unit (e.g., subframe, slot, or symbol). In this case, when a large number of resources are allocated to one terminal, even if the number of allocated resource blocks is reduced, a modulation order or a code rate increases, so that the transport block size (TBS) may become larger.

Hereinafter, a method for allocating resources in the case where the transport block size becomes larger even if the modulation order or code rate becomes high and the number of allocated resource blocks is reduced is described. According to various embodiments, the base station may allocate, to the terminal, a transport block having a transport block size greater than the existing transport block size by raising the power as needed (hereinafter, boosting-based scheduling). Here, the allocation of the transport block having a larger size may mean that a larger amount of data can be transmitted during a unit time (that is, throughput is increased during a unit time). In other words, as the transport block size becomes larger, the base station may provide a high data rate to the terminal. Since a power amplifier of an antenna of the base station receives the maximum power in an average time, the quality of the signal (e.g., error vector magnitude (EVM)) may not be degraded even though the power per tone is increased as much as the number of allocated resource blocks is reduced.

Hereinafter, for convenience of description, a modulation and coding scheme (MCS) level will be described as an example of the modulation order or the code rate level. Here, the modulation order may mean a modulation scheme. That is, the modulation order having a specific order may represent a specific modulation scheme. For example, a modulation order of 2 corresponds to quadrature phase shift keying (QPSK). As another example, a modulation order of 4 corresponds to 16 quadrature amplitude modulation (QAM). As another example, a modulation order of 6 corresponds to 64 QAM. However, the modulation order or code rate is not limited to the MCS level. In some embodiments, the modulation order and the code rate may be separated independently to thus constitute each level. A plurality of modulation schemes (e.g., binary phase shift keying (BPSK), QPSK, 16 QAM, 64 QAM, and 256 QAM) may sequentially form levels according to the modulation order. In addition, they may sequentially form levels according to the magnitude of each code rate.

Figure 2:
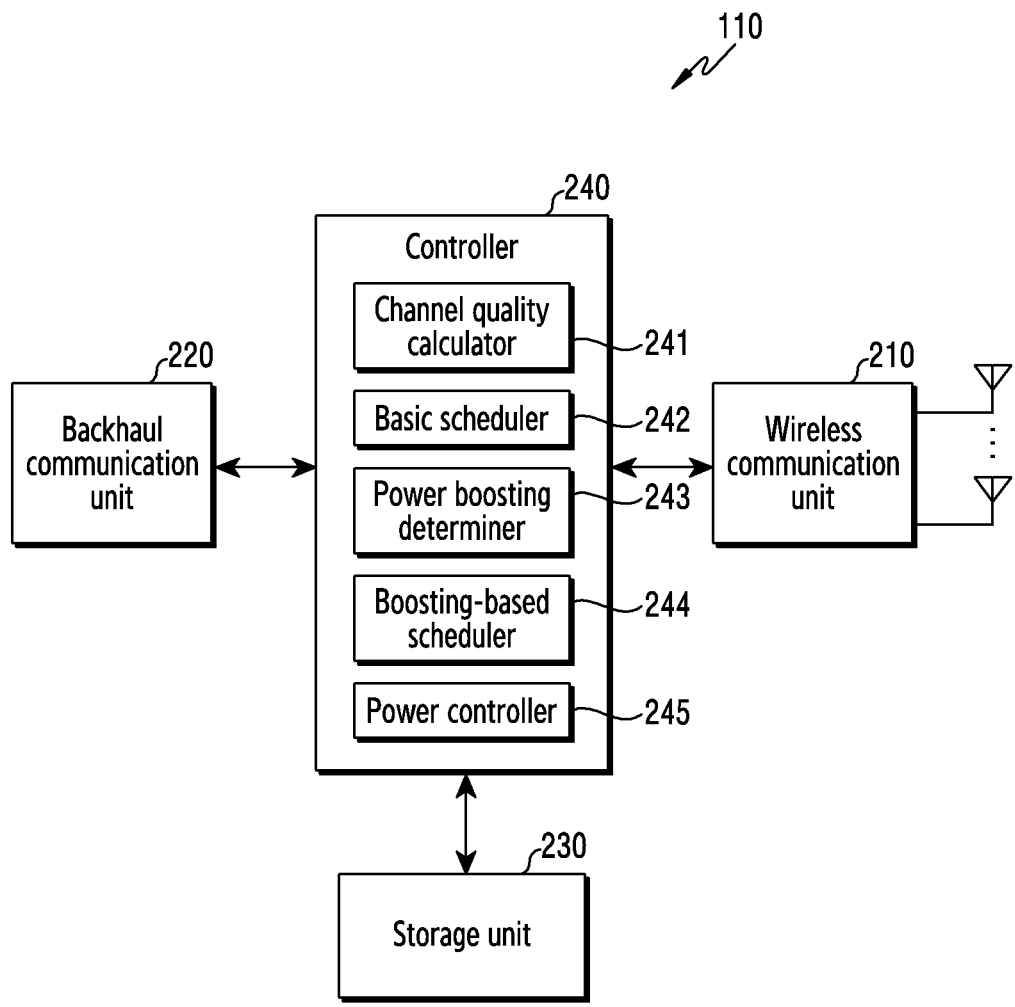
FIG. 2 is a block diagram illustrating a configuration of a base station in a wireless communication system according to various embodiments.

FIG. 2 is a block diagram illustrating a configuration of a base station in a wireless communication system according to various embodiments. It may be understood that FIG. 2 illustrates an example of the configuration of the base station 110. The term " . . . unit" or " . . . er (or)" used herein refers to a unit that processes at least one function or operation, and may be implemented by hardware, software, or a combination thereof.

Referring to FIG. 2, the base station 110 includes a wireless communication unit 210, a backhaul communication unit 220, a storage unit 230, and a controller 240.

The wireless communication unit 210 performs functions of transmitting and receiving signals through a wireless channel. For example, the wireless communication unit 210 performs a function of conversion between a baseband signal and a bit string according to the physical layer specification of a system. For example, in the case of data transmission, the wireless communication unit 210 generates complex symbols by encoding and modulating a transmission bit string. In addition, upon receiving data, the wireless communication unit 210 demodulates and decodes the baseband signal to thus recover a reception bit string. According to various embodiments, the modulation scheme or coding scheme for generating symbols or recovering bit strings may be determined according to the scheduling results by the controller 240.

In addition, the wireless communication unit 210 up-converts a baseband signal to a radio frequency (RF) band signal to thus transmit the same through an antenna, and down-converts an RF band signal received through the antenna to a baseband signal. To this end, the wireless communication unit 210 may include a transmission filter, a reception filter, an amplifier, a mixer, an oscillator, a digital-to-analog converter (DAC), an analog-to-digital converter (ADC), and the like. In addition, the wireless communication unit 210 may include a plurality of transmission/reception paths. The wireless communication unit 210 may include at least one antenna array including a plurality of antenna elements. In terms of hardware, the wireless communication unit 210 may include a digital unit and an analog unit, and the analog unit may include a plurality of sub-units according to operation power, an operation frequency, and the like. According to various embodiments, the wireless communication unit 210 may transmit a signal on the basis of a power value set by the controller 240. According to various embodiments, the wireless communication unit 210 may receive feedback information (e.g., channel state information (CSI) or hybrid automatic repeat request (HARQ) feedback information) from the terminal.

The wireless communication unit 210 transmits and receives signals as described above. Accordingly, the whole or a part of the wireless communication unit 210 may be referred to as a "transmitter", a "receiver", or a "transceiver". In the following description, the transmission and reception performed via wireless channels means that the processing described above is performed by the wireless communication unit 210.

The backhaul communication unit 220 provides an interface for communicating with other nodes in the network. That is, the backhaul communication unit 220 converts a bit string, which is transmitted from the base station 110 to another node, such as another access node, another base station, an upper node, a core network, or the like, into a physical signal and converts a physical signal received from another node into a bit string.

The storage unit 230 stores data such as basic programs, application programs, and setting information for the operation of the base station 110. The storage unit 230 may be configured as a volatile memory, a non-volatile memory, or a combination thereof. The storage unit 230 provides stored data at request by the controller 240. According to various embodiments, the base station 110 may include information on conditions for performing power boosting (e.g., threshold values for respective parameters to activate power boosting).

The controller 240 controls the overall operations of the base station 110. For example, the controller 240 transmits and receives signals via the wireless communication unit 210 or the backhaul communication unit 220. The controller 240 also writes and reads data to and from the storage unit 230. The controller 240 may perform functions of a protocol stack required by the communication standard. To this end, the controller 240 may include at least one processor. According to various embodiments, the controller 240 may perform scheduling (hereinafter, throughput-based scheduling) by adaptively performing power boosting depending on whether or not the transport block size is increased. That is, the controller 240 may perform boosting-based scheduling when the terminal operates in the power boosting mode. When the terminal is not in the power boosting mode, the controller 240, on the basis of channel information received from the terminal, may perform scheduling without power boosting.

The controller 240 may include a channel quality calculator 241 for calculating the channel quality (e.g., signal-to-noise ratio (SNR)) with respect to the terminal, a basic scheduler 242 for allocating MCS levels and resource blocks (RBs) on the basis of the channel quality, a power boosting determiner 243 for determining ON/OFF of the power boosting mode, a boosting-based scheduler 244 for determining an MCS level corresponding to a transport block size greater than the transport block size in the basic scheduler 242 and allocating resource blocks, and a power controller 245 for controlling power of the base station on the basis of the channel quality or the scheduling result. The channel quality calculator 241, the basic scheduler 242, the power boosting determiner 243, the boosting-based scheduler 244, and the power controller 245 may be a set of instructions or codes stored in the storage unit 230, and may be a storage space that stores instructions/codes residing at least temporarily in the controller 240 or instructions/codes, or may be a part of a circuitry constituting the controller 240. According to various embodiments, the controller 240 may perform control such that the base station 110 performs operations according to various embodiments described below.

The configuration of the controller 240 shown in FIG. 2 is only an example, and some configurations may be excluded or modified, or other configurations may be added thereto according to various embodiments.

Figure 3:
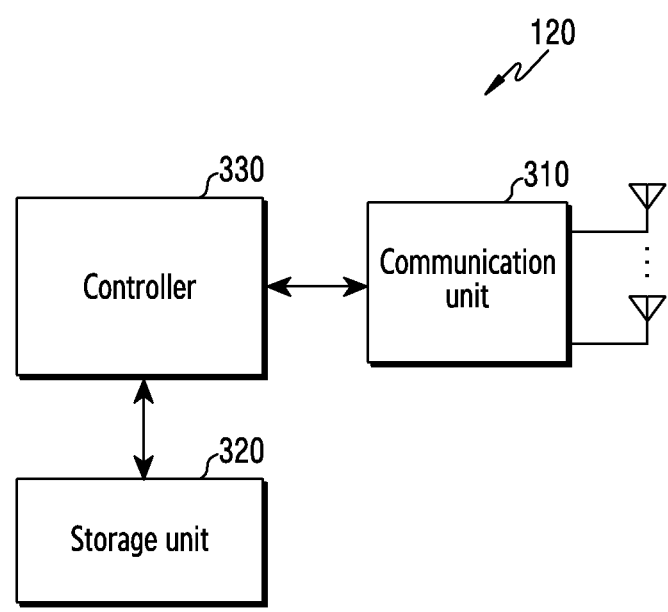
FIG. 3 is a block diagram illustrating a configuration of a terminal in a wireless communication system according to various embodiments.

FIG. 3 is a view illustrating a configuration of a terminal in a wireless communication system according to various embodiments. It may be understood that FIG. 3 illustrates an example of the configuration of the terminal 120. The term " . . . unit" or " . . . er (or)" used herein refers to a unit that processes at least one function or operation, and may be implemented by hardware, software, or a combination thereof.

Referring to FIG. 3, the terminal 120 includes a communication unit 310, a storage unit 320, and a controller 330.

The communication unit 310 performs functions of transmitting and receiving signals through wireless channels. For example, the communication unit 310 performs a function of conversion between a baseband signal and a bit string according to the physical layer specification of the system. For example, in the case of data transmission, the communication unit 310 generates complex symbols by encoding and modulating a transmission bit string. In addition, upon receiving data, the communication unit 310 demodulates and decodes a baseband signal to thus recover a reception bit string. In addition, the communication unit 310 up-converts a baseband signal to an RF band signal to thus transmit the same through an antenna, and down-converts an RF band signal received through the antenna to a baseband signal. For example, the communication unit 310 may include a transmission filter, a reception filter, an amplifier, a mixer, an oscillator, a DAC, an ADC, and the like. In addition, the communication unit 310 may include a plurality of transmission/reception paths. The communication unit 310 may include at least one antenna array including a plurality of antenna elements. In terms of hardware, the communication unit 310 may include a digital circuitry and an analog circuitry (e.g., radio frequency integrated circuit (RFIC)). The digital circuit and the analog circuit may be implemented as a single package. In addition, the communication unit 310 may include a plurality of RF chains.

In addition, the communication unit 310 may include different communication modules for processing signals at different frequency bands. The communication unit 310 may include a plurality of communication modules in order to support a plurality of different wireless access technologies. For example, the different wireless access technologies may include Bluetooth Low Energy (BLE), Wireless Fidelity (Wi-Fi), Wi-Fi Gigabyte (WiGig), cellular networks (e.g., Long Term Evolution (LTE) or new radio (NR)), and the like. The different frequency bands may include super-high frequency (SHF) (e.g., 2.5 GHz, 5 GHz, or the like) bands and millimeter wave (e.g., 38 GHz, 60 GHz, or the like) bands.

The communication unit 310 transmits and receives signals as described above. Accordingly, the whole or a part of the communication unit 310 may be referred to as a "transmitter", a "receiver", or a "transceiver". In the following description, the transmission and reception performed via wireless channels will be used so as to mean that the processing described above is performed by the communication unit 310.

The storage unit 320 stores data such as basic programs, application programs, and setting information for the operation of the terminal 120. The storage unit 320 may be configured as a volatile memory, a non-volatile memory, or a combination thereof. The storage unit 320 provides stored data at a request by or from the controller 330.

The controller 330 controls the overall operations of the terminal 120. For example, the controller 330 transmits and receives signals via the communication unit 310. The controller 330 also writes and reads data to and from the storage unit 320. The controller 330 may perform functions of a protocol stack required by the communication standard. To this end, the controller 330 may include at least one processor or micro-processor, or may be configured as a part of the processor. The controller 330 may include various modules for performing communication. According to various embodiments, the controller 330 may perform throughput-based uplink transmission. When performing power boosting, the controller 330 may perform uplink transmission that provides a larger transport block size by increasing the modulation order or code rate through power boosting, instead of reducing the number of resource blocks allocated by the base station. Meanwhile, if the terminal does not perform power boosting, the controller 330 may perform uplink transmission on the basis of control information (resource blocks, modulation order, or code rate) allocated from the base station. According to various embodiments, the controller 330 may perform control such that the terminal performs operations according to various embodiments described below.

The configuration of the controller 330 shown in FIG. 3 is only an example thereof, and some configurations thereof may be excluded or modified, or other configurations may be added thereto according to various embodiments.

Figure 4A:
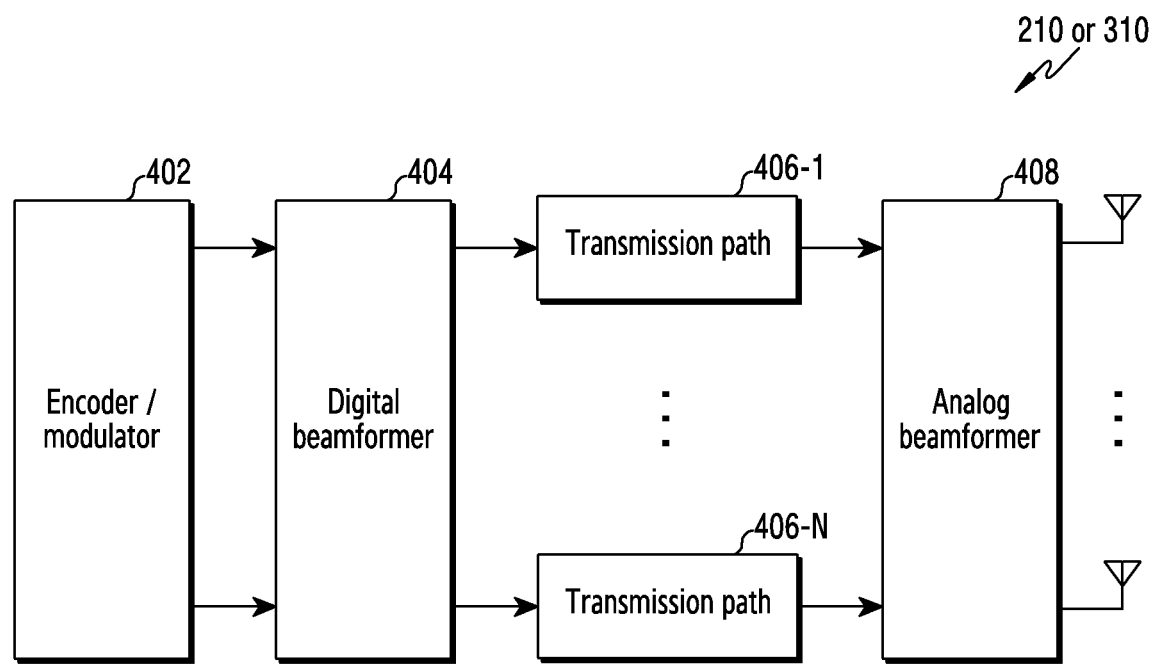
FIGS. 4A to 4C are views illustrating a configuration of a communication unit in a wireless communication system according to various embodiments.
Figure 4B:
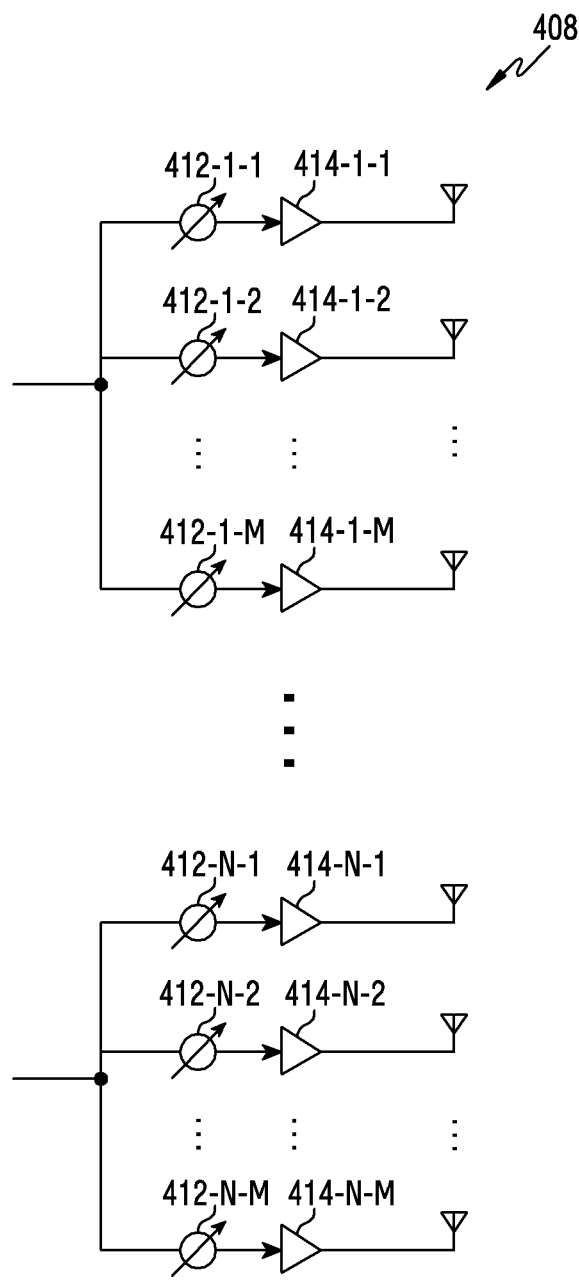
Figure 4C:
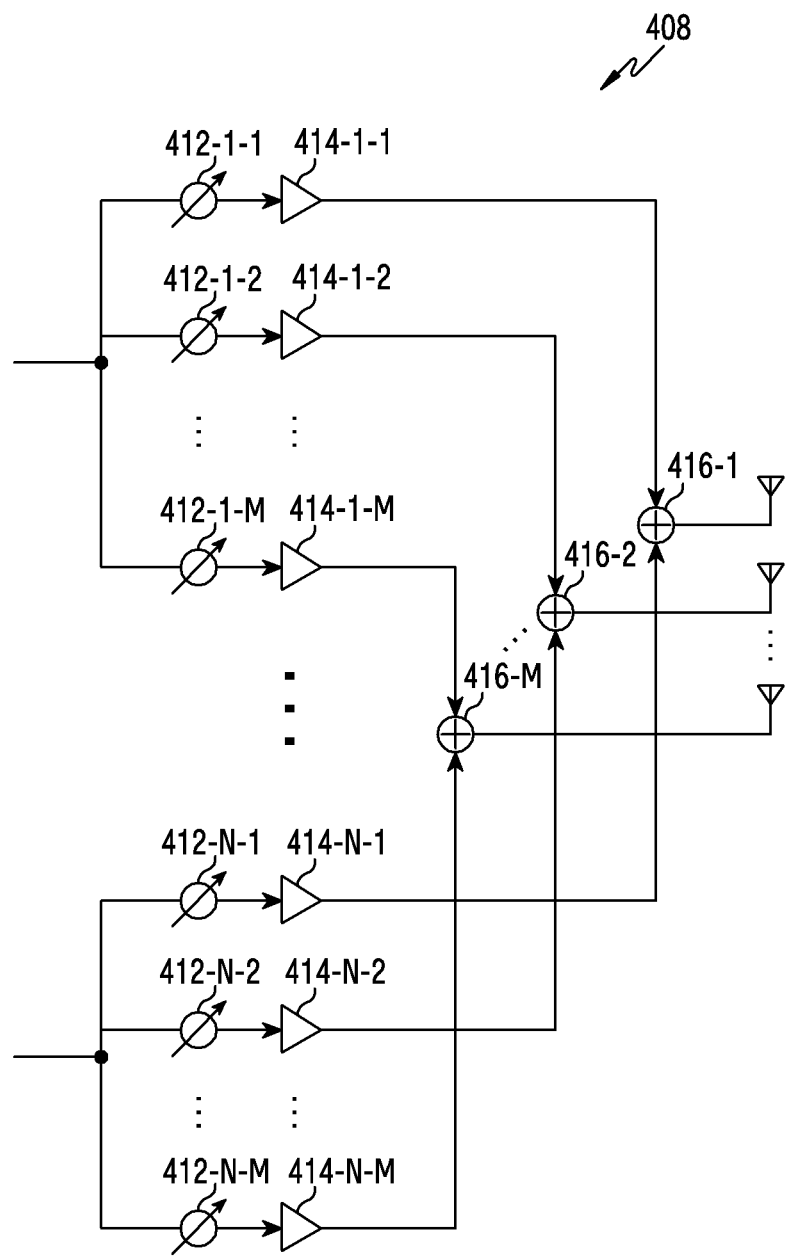

FIGS. 4A to 4C are views illustrating a configuration of a communication unit in a wireless communication system according to various embodiments. FIGS. 4A to 4C are views illustrating a detailed configuration of the wireless communication unit 210 such as the one depicted in FIG. 2 or the communication unit 310 such as the one depicted in FIG. 3. For example, FIGS. 4A to 4C illustrate components for performing beamforming as a part of the wireless communication unit 210 in FIG. 2 or the communication unit 310 in FIG. 3.

Referring to FIG. 4A, the wireless communication unit 210 or the communication unit 310 includes an encoder/modulator 402, a digital beamformer 404, a plurality of transmission paths 406-1 to 406-N, and an analog beamformer 408.

The encoder/modulator 402 performs channel encoding. At least one of low-density parity check (LDPC) code, convolution code, and polar code may be used for the channel encoding. The encoder/modulator 402 generates modulation symbols by performing constellation mapping.

The digital beamformer 404 performs beamforming for digital signals (e.g., modulation symbols). To this end, the digital beamformer 404 multiplies the modulation symbols by beamforming weights. Here, the beamforming weights are used to change the magnitude and phase of the signal, and may be referred to as a "precoding matrix", a "precoder", or the like. The digital beamformer 404 outputs digital beamformed modulation symbols to a plurality of transmission paths 406-1 through 406-N. In this case, according to a multiple-input multiple-output (MIMO) transmission scheme, the modulation symbols may be multiplexed, or the same modulation symbol may be provided to the plurality of transmission paths 406-1 through 406-N.

The plurality of transmission paths 406-1 through 406-N convert digital signals, which are digitally beamformed, into analog signals. To this end, each of the plurality of transmission paths 406-1 to 406-N may include an inverse fast Fourier transform (IFFT) operator, a cyclic prefix (CP) inserter, a digital to analog converter (DAC), and an up-converter. The CP inserter is intended for orthogonal frequency division multiplexing (OFDM), and may be excluded in the case where other physical layer schemes (e.g., filter bank multi-carrier (FBMC)) are applied. That is, the plurality of transmission paths 406-1 through 406-N provide independent signal processing procedures for a plurality of streams generated through digital beamforming. However, depending on the implementation, some of the components of the plurality of transmission paths 406-1 through 406-N may be shared.

The analog beamformer 408 performs beamforming on the analog signal. To this end, the digital beamformer 404 multiplies the analog signals by beamforming weights. Here, the beamforming weights are used to change the magnitude and phase of the signal. More specifically, the analog beamformer 408 may be configured as shown in FIG. 4B or 4C depending on the connection structures between the plurality of transmission paths 406-1 to 406-N and the antennas.

Referring to FIG. 4B, signals input to the analog beamformer 408 are processed with operations of phase/magnitude conversion and amplification and then transmitted through the antennas. At this time, the signals of the respective paths are transmitted through different sets of antennas (i.e., the antenna arrays). As to the processing of a signal input through a first path, the signal is converted into a signal string having the same or different phases/magnitudes by the phase/magnitude converters 412-1-1 to 412-1-M, amplified by the amplifiers 414-1-1 to 414-1-M, and then transmitted through the antennas.

Referring to FIG. 4C, signals input to the analog beamformer 408 are processed with operations of phase/magnitude conversion and amplification and then transmitted through the antennas. At this time, the signals of the respective paths are transmitted through the same set of antennas (i.e., the antenna array). As to the processing of a signal input through a first path, the signal is converted into a signal string having the same or different phases/magnitudes by the phase/magnitude converters 412-1-1 to 412-1-M and amplified by the amplifiers 414-1-1 to 414-1-M. Then, for transmission through one antenna array, the amplified signals are summed by the adders 416-1-1 to 416-1-M on the basis of the antenna elements, and then transmitted through the antennas.

FIG. 4B is a view illustrating an independent antenna array for each transmission path according to an embodiment, and FIG. 4C is a view illustrating transmission paths sharing one antenna array according to an embodiment. However, according to another embodiment, some transmission paths may use independent antenna arrays, and the remaining transmission paths may share one antenna array. According to another embodiment, a structure that may adaptively change depending on the situation may be used by applying a switchable structure between the transmission paths and the antenna arrays.

A transport block size of a physical channel (e.g., physical downlink shared channel (PDSCH)) in a wireless communication system is determined by the MCS level and the number of resource blocks (RBs) capable of transmitting as many allocated buffer occupancies (BOs) as possible. Here, the MCS level is determined by a modulation scheme and a code rate belonging to a certain range of error rate (e.g., within a target frame error rate (FER)).

At the same MCS level, the transport block size may be proportional to the number of allocated resource blocks. That is, the maximum transport block size at a given MCS level may be determined on the basis of the maximum number of available resource blocks. In this case, the power per frequency tone of the downlink may be determined as a value corresponding to a maximum allowable power when all tones are transmitted. This is due to the fact that the maximum use of the transmission power within the power limit of a radio unit (RU) of the base station provides a gain in terms of coverage in the downlink in which the power consumption of the base station is negligible. In addition, many users may be provided with a service over the entire frequency domain by the limited transmission power of the base station.

Low-density parity check (LDPC) coding may be applied as a channel coding scheme for a data channel in a communication system such as Pre 5G (5th generation) and NR (new radio) standards. In the situation in which the complexity of a receiver is limited, the base station or the terminal may transmit/receive a larger amount of data through the LDPC coding. However, since the LDPC coding scheme has a limitation on the number of information bits and the flexibility of a code rate, the block error rate (BLER) performance of each level of the MCS levels may not have an equal interval. As described above, if there is a big interval deviation in the performance between the MCS levels, the downlink communication quality may be degraded due to the quantization of the MCS levels.

To solve the above problems, a base station or a terminal according to various embodiments may perform scheduling on the basis of power boosting. If it is possible to increase the transport block size due to power boosting, a base station or a terminal according to various embodiments may transmit data of a larger resource block size by increasing the amount of data that can be mapped per tone through the power boosting.

Throughput-Based Scheduling

The base station may adaptively perform power boosting, thereby performing scheduling in a manner in which the throughput is maximized (that is, throughput-based scheduling). According to various embodiments, when it is determined that the data rate can be increased by performing power boosting or that an increase in the data rate is required, the base station may perform boosting-based scheduling. When it is impossible to perform power boosting or when it is determined that the data rate cannot be increased even if the power boosting is performed or that an increase in the data rate is not required, the base station may perform scheduling without performing the power boosting.

Hereinafter, the operations of the base station and the terminal or parameters for performing the throughput-based scheduling will be described with reference to FIGS. 5 and 6, according to various embodiments.

Figure 5:
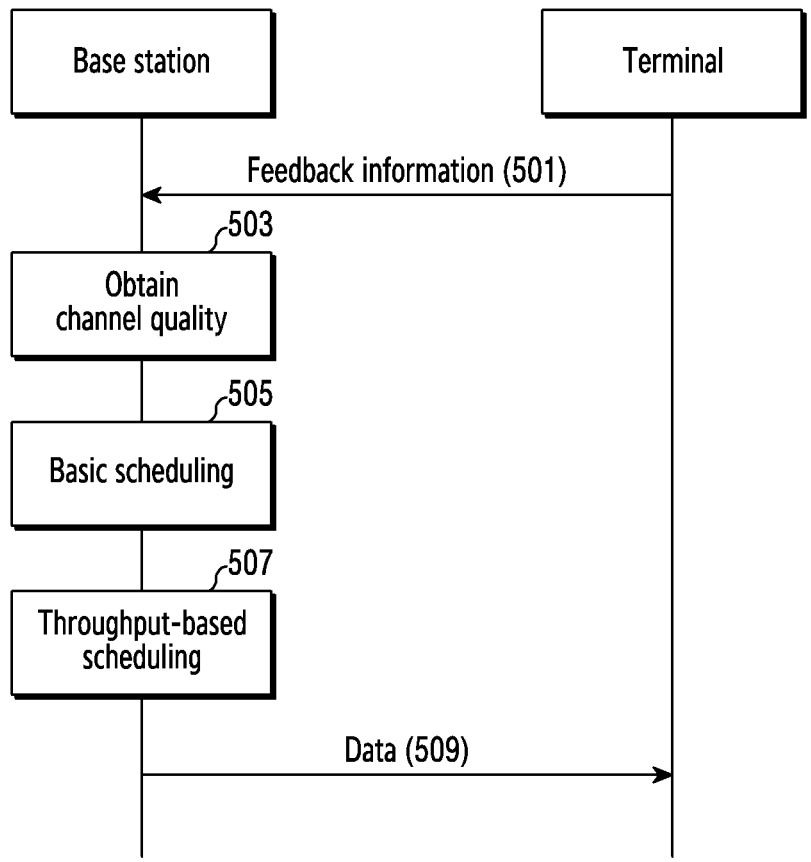
FIG. 5 is a flow diagram illustrating signal flow for throughput-based scheduling according to various embodiments.

FIG. 5 is a flow diagram illustrating signal flow for throughput-based scheduling according to various embodiments. FIG. 5 illustrates a signal exchange between a base station and a terminal according to various embodiments. The base station may include the base station 110 in FIG. 1. The terminal may include the terminal 120 in FIG. 1.

Referring to FIG. 5, the terminal may transmit feedback information to the base station (in operation 501). The base station may receive feedback information from the terminal. The feedback information may be intended for a link adaptation (LA) that is performed in order to adapt to a channel change over time in a wireless channel environment. The link adaptation may include a closed-loop rate control (CLRC) and outer-loop rate control (OLRC). In addition, the terminal may measure or estimate the channel quality of a reference signal transmitted from the base station, and may give, as feedback, a value indicating the channel quality to the base station.

According to various embodiments, the feedback information may include channel state information. The channel state information may include at least one of a rank indicator (RI), a precoding matrix indicator (PMI), or a channel quality indicator (CQI). The terminal may give, as a feedback, the CQI to the base station. The CQI may indicate a modulation scheme and/or a code rate that can attain a desired target error rate (e.g., a frame error rate (FER), a block error rate (BLER), and a packet error rate (PER)) in the estimated channel quality.

According to various embodiments, the feedback information may include HARQ feedback information. The base station transmits a downlink signal to the terminal. The base station receives Acknowledge (ACK)/Non-Acknowledge (NACK) on the downlink signal from the terminal. The HARQ feedback information may be used for adjustment and acquisition of the channel quality.

In operation 503, the base station may obtain the channel quality on the basis of the feedback information. For example, the base station may obtain a channel quality value indicated by the CQI received from the terminal. In addition, the base station may apply an offset of the OLRC to the channel quality value depending on the ACK/NACK, thereby obtaining a new channel quality value. Here, the channel quality may be at least one of a signal-to-interference and noise ratio (SINR), a carrier-to-interference and noise ratio (CINR), beam reference signal received power (BRSRP), reference signal received power (RSRP), reference signal received quality (RSRQ), a received signal strength indicator (RSRI), error vector magnitude (EVM), a bit error rate (BER), and/or a block error rate (BLER). Hereinafter, the SINR will be described as an example of the channel quality. In the following description, the high channel quality means that the channel quality value related to the signal magnitude is large or means that the channel quality value related to the error rate is small according to various embodiments. The higher the channel quality, the better the wireless communication environment that can be guaranteed. According to an embodiment, when receiving feedback information from a plurality of terminals, the base station may obtain and manage the channel quality for each of the plurality of terminals. Each channel quality may be obtained on the basis of channel feedback or HARQ feedback.

In operation 505, the base station may perform basic scheduling. Herein, the basic scheduling refers to general scheduling performed on the basis of the feedback information received from the terminal before performing power boosting described later. The scheduling may include determining the MCS level and allocating resource blocks.

The base station may determine the MCS level on the basis of the channel quality obtained (in operation 503). For example, the base station may determine the MCS level on the basis of the obtained SINR. There is a range of SINR (e.g., maximum threshold value) corresponding to each MCS level. The base station may determine an MCS level corresponding to the range of SINR to which the obtained SINR belongs.

The base station may determine the size of resource blocks to be allocated to the terminal according to the determined MCS level and the state of a buffer. The resource block size may be determined according to the MCS level and the number of resource blocks to be allocated. In other words, the base station may determine, on the basis of buffer occupancy (BO), the number of resource blocks to be allocated. For example, if the amount of buffer usage is equal to or more than a specific value, the base station may allocate all of the allocable resource blocks (e.g., 100 RBs) to the terminal.

In operation 507, the base station may perform throughput-based scheduling. The throughput-based scheduling may include an operation of identifying the MCS level having a larger transport block size (i.e., more bits than the result of the basic scheduling) and the number of resource blocks thereof by performing power boosting and an operation of obtaining the result of the basic scheduling and deciding not to perform the power boosting. The base station may selectively operate a scheduling scheme with high throughput depending on whether or not the power boosting is activated.

The throughput-based scheduling may include a scheduling scheme (i.e., boosting-based scheduling) in which a resource having a resource block size greater than the result of the basic scheduling is allocated using power boosting to further increase the power value. When the base station performs boosting-based scheduling, the base station may perform downlink physical channel processing using the boosting-based scheduling result. Here, the downlink physical channel processing includes procedures of applying, to bits of the transport block, a modulation scheme (e.g., BPSK, QPSK, 16 QAM, 64 QAM, or 256 QAM) and a coding scheme corresponding to the MCS level determined according to each scheduling result and of mapping resource elements (REs) of each of the resource blocks allocated to each symbol according to the respective scheduling results. The base station allocates a number of resource blocks, which is reduced through power boosting, to the terminal while providing an increased data rate by increasing the MCS level.

The throughput-based scheduling may include an operation of obtaining a basic scheduling result and deciding not to perform power boosting. When the base station does not perform power boosting, the base station may perform downlink physical channel processing using the basic scheduling result.

An embodiment of the throughput-based scheduling may also include an operation of determining whether or not to perform power boosting on the basis of a specified condition or an obtained basic scheduling result or an operation of performing physical channel processing using the obtained basic scheduling result without performing power boosting.

In operation 509, the base station may transmit data to the terminal. The terminal may receive data from the base station. The base station may transmit data to the terminal by applying a modulation scheme according to the modulation order of the MCS level of the scheduling result in operation 507 and channel coding according to a code rate thereof. For example, if the MCS level indicates a modulation order of 4, the data may be data to which 16 QAM is applied from the bit strings of the transport block. Although it is not shown in FIG. 5, the base station may transmit, to the terminal, downlink control information (DCI) indicating the MCS level on a control channel (e.g., physical downlink control channel (PDCCH)). The terminal may decode the DCI to thus obtain the modulation scheme and the code rate applied to the data.

The base station may transmit data to the terminal through a frequency domain corresponding to the number of resource blocks of the scheduling result (in operation 507). The base station may transmit, to the terminal, a DCI instructing allocation of resource blocks (e.g., RB assignment) on the control channel (e.g., PDCCH). The terminal may decode the DCI, and may receive data through the frequency domain assigned to the terminal.

The base station may provide the terminal with a larger size of data through power boosting. As a result, the amount of data transmission per unit time (i.e., data rate) increases. Even if the power per tone increases, the number of allocated resource blocks is reduced less than the number of resource blocks of the basic scheduling result, so that the total power may be maintained. Accordingly, the data reception quality of the terminal is not degraded.

Although a scheduling and link adaptation procedure for downlink data transmission has been described with reference to FIG. 5, the throughput-based scheduling of various embodiments may be applied to other transmissions. For example, the terminal may perform throughput-based scheduling from an uplink grant allocated from the base station.

Hereinafter, detailed operations of the base station for throughput-based scheduling according to various embodiments will be described with reference to FIG. 6.

Figure 6:
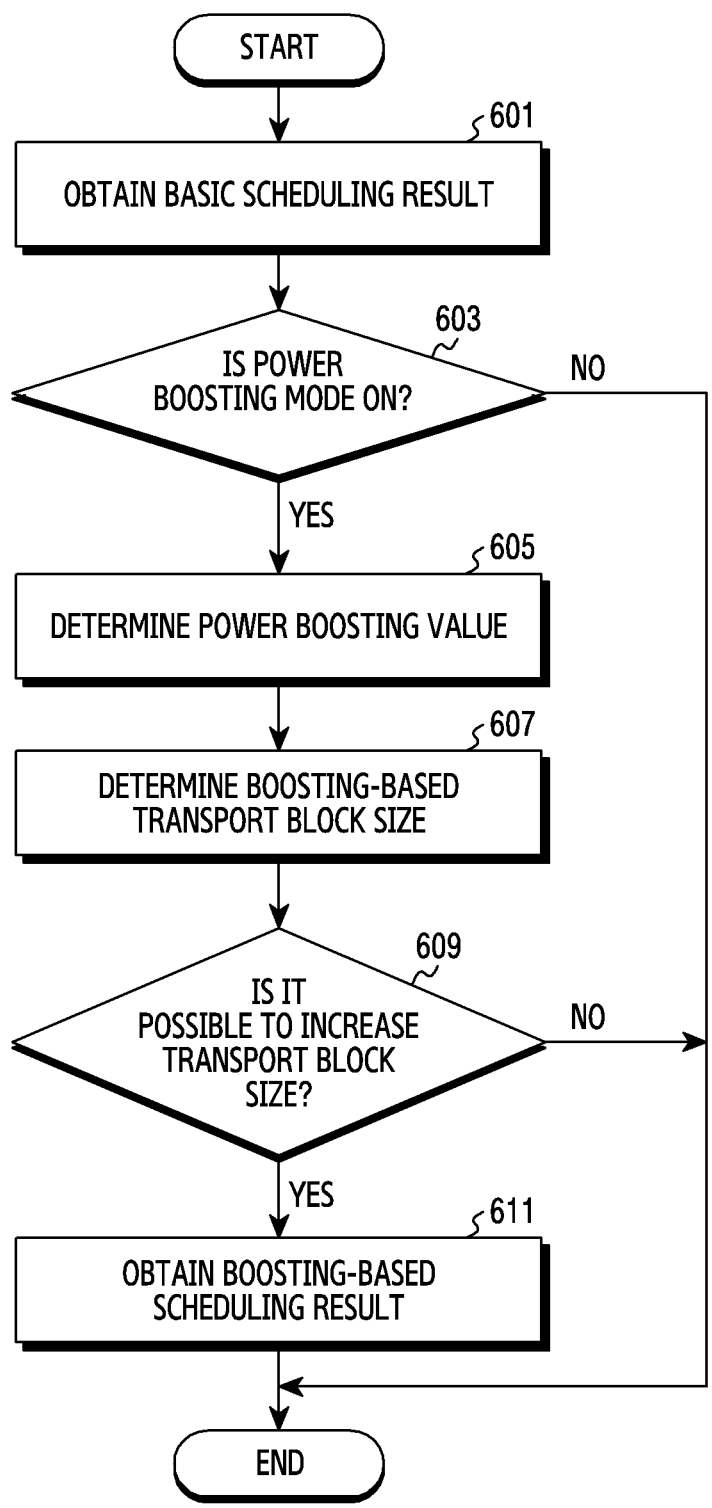
FIG. 6 is a flowchart illustrating throughput-based scheduling by a base station according to various embodiments.

FIG. 6 is a flowchart illustrating throughput-based scheduling by a base station according to various embodiments. The base station may include the base station 110 in FIG. 1.

Referring to FIG. 6, the base station may obtain a basic scheduling result (in operation 601). The basic scheduling does not consider power boosting, and the base station may obtain the MCS level and the number of resource blocks according to the estimated channel quality. For convenience of explanation, the MCS level of the basic scheduling result will be referred to as a "first MCS level". In addition, the number of resource blocks of the basic scheduling result will be referred to as the "number of first resource blocks". The transport block size according to the first MCS level and the number of first resource blocks will be referred to as a "first TBS".

In operation 603, the base station may determine whether or not to operate the power boosting mode. The base station may determine whether the power boosting mode is ON or OFF. When the power boosting mode is ON, the base station may or may not perform power boosting. When the power boosting mode is OFF, the base station cannot perform power boosting. The power boosting mode may be set to be performed when a specified condition (hereinafter, power boosting condition) is fulfilled. The power boosting condition may be set in consideration of the limit to which the throughput can increase by power boosting. According to various embodiments, the base station may determine whether or not to operate the power boosting mode on the basis of the basic scheduling result. According to various embodiments, the base station may determine whether or not to operate the power boosting mode on the basis of the data. Various examples of the power boosting condition will be described below with reference to FIG. 7.

When the power boosting mode is OFF, the base station may terminate the procedure. In other words, the base station may terminate the throughput-based scheduling procedure in the state in which only the basic scheduling result is obtained (in operation 601). The base station may perform physical channel processing according to the basic scheduling result.

When the power boosting mode is ON, the base station may determine a power boosting value (in operation 605). The base station may determine the power boosting value using a channel quality value (hereinafter, referred to as an "estimated channel quality value") used in obtaining the first MCS level as the basic scheduling result. The base station may identify a threshold channel quality value (hereinafter, referred to as a "target threshold channel quality value") of an MCS level (hereinafter, referred to as a "second MCS level") higher than the first MCS level. For example, the second MCS level may indicate a modulation scheme and a code rate that is one level higher than the first MCS level. As another example, the second MCS level may be two levels higher in modulation scheme and a code rate than the first MCS level. As another example, the second MCS level may be three levels higher in modulation scheme and a code rate than the first MCS level. Here, a high MCS level may mean a modulation scheme of a high modulation order, or may mean a high code rate. On the other hand, a low MCS level may mean a modulation scheme of a low modulation order, or may mean a low code rate. That is, the second MCS level indicates a modulation order higher than the first MCS level or indicates a higher code rate even with the same modulation order. When the same number of resource blocks are allocated, the transport block size (amount of data) based on the second MCS level is greater than the transport block size based on the first MCS level.

The base station may determine a boosting value on the basis of the difference between the target threshold channel quality value and the estimated channel quality value. Hereinafter, the power value corresponding to the difference in the channel quality (e.g., SINR) between the first MCS level and the second MCS level may be referred to as a "power boosting value" or a "required boosting level" in various embodiments. The base station may obtain a power boosting value. For example, if the SINR obtained on the basis of the feedback information received from the terminal is 2 dB, and if the threshold SINR value corresponding to the second MCS level is 5 dB, the base station may obtain a power boosting value of 3 dB.

In some embodiments, the base station may operate a plurality of second MCS levels. That is, in order to determine the maximum transport block size, the base station may obtain a plurality of MCS levels as the second MCS levels. The base station may obtain target threshold channel quality values for the respective MCS levels. The base station may calculate a plurality of power boosting values using the differences between the estimated channel quality value and respective target threshold channel quality values.

In operation 607, the base station may determine a boosting-based transport block size. Here, the boosting-based transport block size may be the maximum transport block size (hereinafter, referred to as a "second TBS") that can be allocated to the terminal at the power boosting value and the second MCS level obtained in operation 605. The base station may determine the second TBS on the basis of the reduced number of resource blocks (hereinafter, referred to as "second resource blocks"), while increasing the power per tone according to the power boosting value, and the second MCS level. The number of second resource blocks may be reduced, compared to the number of first resource blocks by a percentage at which the transmission power increases. The base station may obtain the maximum allocable transport block size using a combination of the second MCS level and the number of resource blocks as many as possible. A detailed example will be shown as follows.

First, the base station may determine a range of the number of resource blocks allocable to the terminal on the basis of the power boosting value. The power boosting value means an increment in the power value. The base station may identify the number of resource blocks having the maximum transport block size, among the numbers of resource blocks that can be reduced by a percentage at which the transmission power increases. According to an embodiment, the base station may determine, on the basis of Equation 1 below, a range of the number of second resource blocks.

$$P_1 \times Q_1 \geq P_2 \times Q_2 \quad \text{[Equation 1]}$$

In Equation 1, $P_1$ is a power value per tone prior to power boosting, $Q_1$ is the number of resource elements prior to power boosting, $P_2$ is a power value per tone after power boosting, and $Q_2$ is the number of resource elements after power boosting. $P_1$ may have a value equal to or more than the threshold channel quality value corresponding to the first MCS level and less than the threshold channel quality value corresponding to the second MCS level. Here, the tone may indicate a resource corresponding to one subcarrier. For example, $Q_1$ may be the number of resource elements corresponding to the number of first resource blocks allocated in the basic scheduling result. $P_2$ may be a threshold channel quality value corresponding to the second MCS level, or may be an approximate value within a certain range of the threshold channel quality value.

The base station may identify, on the basis of Equation 1, a range of the number of second resource blocks. For example, if the power boosting value is 10·log 2 dB (≈3 dB), the base station may double the power. That is, $P_2=2\cdot P_1$. The base station may identify a range of the number of the second resource blocks less than half the number of the first resource blocks. For example, when the number of the first resource blocks is 100, the base station may identify a range of the number of the second resource blocks as 50 or less.

The base station may identify the number of the second resource blocks within the range of the number of the second resource blocks. First, the base station may identify a candidate for the number of resource blocks allocable to the terminal within the range of the number of the second resource blocks. The more the allocated resource blocks, the larger the transmittable transport block size. Therefore, the base station may identify, as a candidate, the maximum number of resource blocks within the range of the number of the second resource blocks. That is, the candidate identified according to various embodiments may be the number of resource blocks that can provide the largest transport block size within the range of the number of second resource blocks. For example, the base station may identify the number of second resource blocks that can be allocated in a communication system within the range of the number of second resource blocks. For example, the base station may determine the number of the second resource blocks to be 48 that is the largest number, among the multiples of 4, within a range of 50 or less. As another example, the base station may determine the number of second resource blocks to be 50.

In some embodiments, when calculating a plurality of power boosting values, the base station may calculate respective transport block sizes according to the second MCS level and the maximum number of resource blocks corresponding to each power boosting value. The base station may identify, as a second TBS, the largest transport block size, among the calculated transport block sizes.

In operation 609, the base station may determine whether or not the transport block size can be increased. The base station may determine whether or not the transport block size can be increased through power boosting. The base station may determine whether or not the boosting-based transport block size is greater than the transport block size of the basic scheduling result. The boosting-based transport block size is the maximum transport block size allocable to the terminal at the second MCS level, which is determined in operation 607, and is referred to as a "second TBS". That is, the base station may determine whether or not the second TBS obtained in operation 607 is greater than the first TBS obtained in operation 601.

The base station may determine whether or not the transport block size is increased by reducing the number of allocated resource blocks and increasing the modulation or code rate level. According to various embodiments, on the basis of a specified table, the base station may determine whether or not the transport block size is increased. For example, the specified table may define transport block sizes depending on the MCS level and the number of resource blocks.

According to various embodiments, the base station may determine whether or not the transport block size is increased using a predefined formula. For example, the base station may determine the transport block size using a specified formula with at least one parameter, such as the number of layers mapped with codewords, time-frequency resources, a modulation order, or a code rate. The base station may determine the transport block size (first TBS) using parameter values prior to power boosting. The base station may determine the transport block size (second TBS) using parameter values that can be obtained when performing power boosting. The base station may determine whether or not the transport block size is increased according to the power boosting by comparing the transport block sizes before and after the power boosting.

If the second TBS is less than or equal to the first TBS, the base station may not obtain the result according to the power boosting-based scheduling. This is due to the fact that it is not necessary to allocate a transport block size with a lower throughput than the basic scheduling result. The base station may terminate the throughput-based scheduling procedure in the state in which only the basic scheduling result is obtained in operation 601.

If the second TBS is greater than the first TBS, the base station may obtain a boosting-based scheduling result in operation 611. The base station may determine a second MCS level higher than the first MCS level. The base station may perform power boosting according to a power boosting value. The base station may determine the number of second resource blocks less than the number of the first resource blocks. If the second TBS corresponding to the candidate for the number of resource blocks is greater than the first TBS, the base station may obtain the candidate as the number of second resource blocks. The base station may allocate resource blocks to the terminal by the number of the second resource blocks.

According to various embodiments, the base station may perform boosting-based scheduling using the calculation results in operations 605 to 609. For example, the base station may determine the second MCS level used in calculating the power boosting value in operation 605. For example, the base station may allocate resources to the terminal by the number of resource blocks corresponding to the transport block size calculated in operation 607.

Although it is not shown in FIG. 6, the base station may transmit control information (e.g., DCI) including the throughput-based scheduling result to the terminal. The terminal may receive control information from the base station, and may determine a resource area (e.g., search space) for receiving and decoding data and an MCS level for demodulation. The terminal, using the power boosting mode, may receive a larger amount of data than when there is no power boosting.

Although FIG. 6 describes that the base station obtains the boosting-based scheduling results in operation 611, at least some of the boosting-based scheduling results may be performed in the previous operation. That is, the throughput-based scheduling procedure in FIG. 6 is only one example of the throughput-based scheduling procedure of an embodiment, and is not limited to a specific sequence. For example, an embodiment may encompass the case in which some operations (e.g., operation 603) are not performed and the case in which another operation is performed first (e.g., operation 605 is performed before operation 603).

Although the scheduling applied to a single terminal has been described as an example in FIG. 6, various embodiments can also be applied to a plurality of terminals. Even if the throughput-based scheduling is performed for each of the plurality of terminals, the base station may perform operations 601 to 611 for each terminal in the same manner. The base station may perform MCS level identification and resource block allocation for each terminal by performing the throughput-based scheduling for each terminal.

Although the base station performs the throughput-based scheduling on the basis of the downlink in FIG. 6, various embodiments are not limited thereto. That is, the terminal may perform, on the basis of power boosting, the throughput-based scheduling from the basic scheduling result on the basis of the uplink.

As described in FIGS. 5 and 6, the base station may perform throughput-based scheduling. The throughput-based scheduling according to various embodiments may include determining a power boosting mode, determining whether or not the transport block size is increased, and boosting-based scheduling. The base station may perform physical channel processing of data using the basic scheduling result or a newly obtained boosting-based scheduling result.

Hereinafter, specific conditions for activating the power boosting mode in operation 603 will be described with reference to FIG. 7 according to various embodiments.

Power Boosting Mode

The base station or the terminal according to various embodiments may operate in a power boosting mode. Here, the power boosting mode means the availability of scheduling to apply an MCS level different from the previously obtained MCS level using power boosting. For example, when the power boosting mode is ON, the base station may perform scheduling in which an MCS level different from the MCS level corresponding to the channel quality information received from the terminal is applied. When the power boosting mode is OFF, the base station performs scheduling at the MCS level corresponding to the channel quality information. Hereinafter, examples of an activation condition of the power boosting mode (i.e., power boosting condition) will be described with reference to FIG. 7, according to various embodiments.

Figure 7:
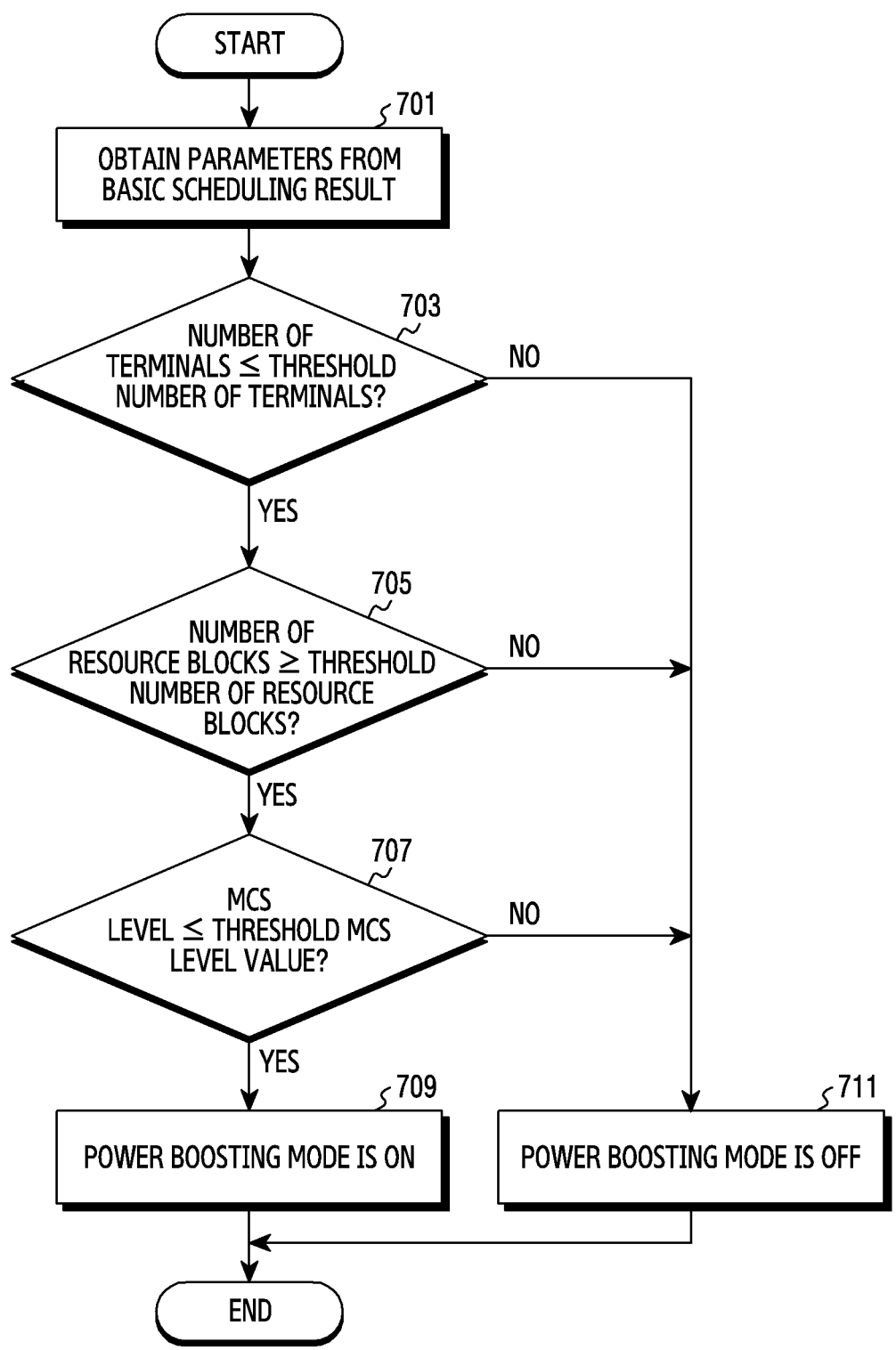
FIG. 7 is a flowchart illustrating activating power boosting by a base stations according to various embodiments.

FIG. 7 is a flowchart illustrating activation of power boosting by a base station according to various embodiments. The base station may include the base station 110 in FIG. 1. The base station may determine whether or not the power boosting condition is fulfilled.

Referring to FIG. 7, the base station may obtain parameters from the basic scheduling result in operation 701. For example, the base station may obtain an MCS level (i.e., first MCS level) from the basic scheduling result. For example, the base station may obtain the estimated channel quality upon identifying the first MCS level. For example, the base station may obtain the resource blocks allocated as a result of the basic scheduling (i.e., the number of first resource blocks).

In operation 703, the base station may determine whether or not the number of terminals is equal to or less than a threshold number of terminals. Here, the number of terminals (hereinafter, referred to as "scheduling terminals") may indicate the terminals that need scheduling for a unit scheduling time (e.g., transmission time interval (TTI)). The number of scheduling terminals corresponds to the number of terminals on which the basic scheduling result is performed. When a plurality of terminals are allocated to the entire frequency domain during the unit scheduling time, the number of resource blocks allocated to each terminal may be smaller than the number of resource blocks allocated to only a single terminal. The smaller the number of resource blocks allocated to the terminal, the less the deviation in the transport block size between the MCS levels. That is, the smaller the number of resource blocks allocated to the terminal, the less the effect of an increase in the transport block size due to the throughput-based scheduling of various embodiments. Accordingly, the base station may set a range of the number of scheduling terminals in order to increase the scheduling efficiency due to a power boosting determination.

The threshold number of terminals (UE_threshold) may be set to be fixed or variable. For example, the threshold number of terminals may be set to 1. As another example, the threshold number of terminals may be set to 2. The threshold number of terminals may be preset on the basis of the transport block size according to the specification of a communication system.

According to various embodiments, the threshold number of terminals may be set to be variable according to a transmission bandwidth (or a system bandwidth or a channel bandwidth). For example, if the downlink transmission bandwidth is 20 MHz, the base station may set the threshold number of terminals to 1. As another example, if the downlink transmission bandwidth is 100 MHz, the base station may set the threshold number of terminals to 5.

According to various embodiments, the threshold number of terminals may be set to the maximum number of scheduling terminals. As the threshold number of terminals is set to the maximum number, it is possible to determine whether or not the power boosting condition is fulfilled without relying on the number of terminals that need allocation.

If the number of scheduling terminals is equal to or less than the threshold number of terminals, the base station may perform operation 705. If the number of the scheduling terminals exceeds the threshold number of the terminals, the base station may perform operation 711. This is due to the fact that it is difficult to increase the transport block size through the boosting-based scheduling because the minimum condition on boosting is not fulfilled.

In operation 705, the base station may determine whether or not the number of resource blocks is equal to or less than the threshold number of resource blocks. Here, the number of resource blocks is the number of resource blocks allocated to each terminal. The number of resource blocks may be the number of first resource blocks obtained from the basic scheduling result. As described above, if the number of resource blocks allocated to the terminal is equal to or less than a predetermined value, the deviation in the transport block size between the MCS levels may be reduced, so that the throughput-based scheduling may be less effective. The base station may set a range of the number of resource blocks allocated to each terminal in order to maximize the effect of power boosting. If the number of allocated terminals during the unit scheduling time is one, the number of resource blocks corresponds to the number of resource blocks corresponding to the entire channel bandwidth.

The threshold number of resource blocks (RB_threshold) may be fixed or variable. For example, the threshold number of resource blocks may be set to 100 RBs. The threshold number of resource blocks may be preset on the basis of the transport block size according to the specification of a communication system.

According to various embodiments, the threshold number of resource blocks may be set according to resource configuration. For example, the threshold number of resource blocks may be set according to a frequency range (FR) (e.g., whether or not it is more than 6 GHz) in which the terminal can operate. For example, the threshold number of resource blocks may be set according to subcarrier spacing (SCS). For example, the threshold number of resource blocks may be set according to the size of the transmission bandwidth.

According to various embodiments, the threshold number of resource blocks may be set to a minimum number of allocable resource blocks. That is, the threshold number of resource blocks may be set to zero. As the threshold number of terminals is set to the minimum number, it is possible to determine whether or not the power boosting condition is fulfilled without relying on the number of allocable resource blocks.

If the number of first resource blocks is equal to or more than the threshold number of resource blocks, the base station may perform operation 707. If the number of first resource blocks is less than the threshold number of resource blocks, the base station may perform operation 711. This is due to the fact that it is difficult to increase the transport block size through the boosting-based scheduling because the minimum condition on boosting is not fulfilled.

In operation 707, the base station may determine whether or not the MCS level is equal to or less than a threshold MCS level value. Here, the MCS level may be the first MCS level.

In general, a large amount of data can be transmitted at a high MCS level, whereas a relatively small amount of data is transmitted at a low MCS level. In a communication standard requiring a large amount of data, it may be difficult to set equal intervals between the MCS levels. In particular, there may be an increase in the deviation between the transport block sizes that can be provided in a low code rate or in a low-modulation order scheme. Therefore, the base station may set a range of the MCS level in order to enhance the scheduling effect due to power boosting.

The threshold MCS level value (MCS_threshold) may be set to be fixed or variable. For example, the threshold MCS level value may be set to 3. The threshold MCS level value may be preset on the basis of the transport block size according to the specification of a communication system.

According to various embodiments, the modulation order and the code rate as a power boosting condition on the MCS level may be determined separately in operation 709. That is, the base station may independently determine whether or not a power boosting condition on the modulation order or a boosting condition on the code rate is fulfilled.

According to various embodiments, the threshold MCS level value may be set on the basis of the type of data. For example, the threshold MCS level value may be set depending on the service type of data. The threshold MCS level value may be set differently depending on whether the service type of data to be transmitted is an enhanced mobile broadband (eMBB) or ultra-reliable low-latency communication (URLLC). As another example, the threshold MCS level value may be set according to the packet size of the provided data. The threshold MCS level value may be set differently depending on whether or not the data is a voice over Internet Protocol (VoIP) packet.

According to various embodiments, the threshold MCS level value may be set to the maximum value of the MCS level provided by the specification. For example, the threshold MCS level value may be set to 15. As the threshold MCS level value is set to the maximum value, the base station may determine whether or not the power boosting condition is fulfilled without relying on the MCS level according to the basic scheduling result (i.e., the first MCS level).

If the first MCS level is equal to or less than the threshold MCS level value, the base station may perform operation 709. If the first MCS level exceeds the threshold MCS level value, the base station may perform operation 711.

The base station may activate the power boosting mode (set power boosting mode to ON) in operation 709. The base station may not activate the power boosting mode (set power boosting mode to OFF) in operation 711.

Various conditions for activating the power boosting mode have been described in series with reference to FIG. 7. However, various embodiments are not limited to the embodiment shown in FIG. 7. In some embodiments, it may not be determined whether or not at least one of the conditions shown in FIG. 7 is fulfilled. For example, the threshold number of terminals may be set to the maximum number of terminals that can be allocated with resources, the threshold number of resource blocks may be a minimum value of 0, and the threshold MCS level value may be the maximum MCS level. In an embodiment, the base station may always operate in the state in which the power boosting mode is ON without using all of the three conditions described above.

Although FIG. 7 shows that the base station determines whether or not the boosting condition is fulfilled in the order of the condition on the number of scheduling terminals, the condition on the number of resource blocks, and the condition on the MCS level, various embodiments are not limited thereto. For example, the base station may determine whether or not the condition on the MCS level is fulfilled, and may then determine whether or not the condition on the number of resource blocks is fulfilled if the condition on the MCS level is fulfilled. In other words, the base station may determine whether or not the respective conditions are fulfilled in various orders, thereby determining whether or not to activate the power boosting mode.

Although it is not shown in FIG. 7, the base station may determine whether or not other conditions are fulfilled in order to activate the power boosting. In some embodiments, the base station may determine whether or not the power boosting is enabled on the basis of the service type of data (eMBB or URLLC). In the case of a service, such as URLLC, in which reliability is ensured, it may not meet the purpose of the service to increase the MCS level for transmitting a large amount of data. On the other hand, in a service requiring a large amount of data to be transmitted, such as an eMBB, it may meet the purpose of the throughput-based scheduling. Accordingly, the base station may determine whether or not to activate the power boosting mode depending on the type of data to be transmitted to the terminal.

In some other embodiments, the base station may determine whether or not to activate the power boosting mode on the basis of the maximum modulation order (e.g., 64 QAM or 256 QAM) that can be set on the data. As the settable maximum modulation order becomes higher, it may be more difficult to increase the transport block size due to power boosting. Accordingly, the base station may determine whether or not to activate the power boosting mode according to the maximum modulation order of the data to be transmitted to the terminal.

In some other embodiments, the base station may determine whether or not the power boosting value is equal to or less than a threshold boosting value (boosting threshold). The higher the boosting value, the larger the power per tone. However, excessive power increase may cause interference with peripheral terminals. In addition, a sufficient transport block size may not be provided because the number of resource blocks is reduced with an increase in the power. Thus, the base station may limit the power boosting value for activation of the power boosting mode. If a required power boosting value exceeds the threshold value, the base station may not activate the power boosting mode. If the power boosting value is equal to or less than the threshold value, the base station may activate the power boosting mode. In this case, operation 605 in FIG. 6 may be performed by acquiring the power boosting value calculated in operation 603.

In some other embodiments, the base station may determine whether or not the system bandwidth is equal to or more than a threshold bandwidth value (BW_threshold). The number of allocable resource blocks in a low system bandwidth may not provide a sufficient transport block size. Thus, the base station may set a range of system bandwidth for activation of the power boosting mode.

The base station may determine whether or not to activate the power boosting mode (that is, ON/OFF of the power boosting mode) in various manners as well as the above-described examples. For example, the base station may determine ON/OFF of the power boosting mode in an on-demand manner according to a user setting or higher layer signaling. In addition, the base station may determine ON/OFF of the power boosting mode by a combination of two or more of the above-described techniques.

Although FIG. 7 shows that the base station determines whether or not the boosting condition for activating the power boosting is fulfilled, it may be determined whether or not the boosting mode is activated according to the terminal settings. According to an embodiment, upon receiving, from the terminal, a message requesting activation of the power boosting mode, the base station may activate the power boosting mode.

Hereinafter, an example of throughput-based scheduling and the performance thereof will be described with reference to FIGS. 8 and 9 according to various embodiments.

Figure 8:
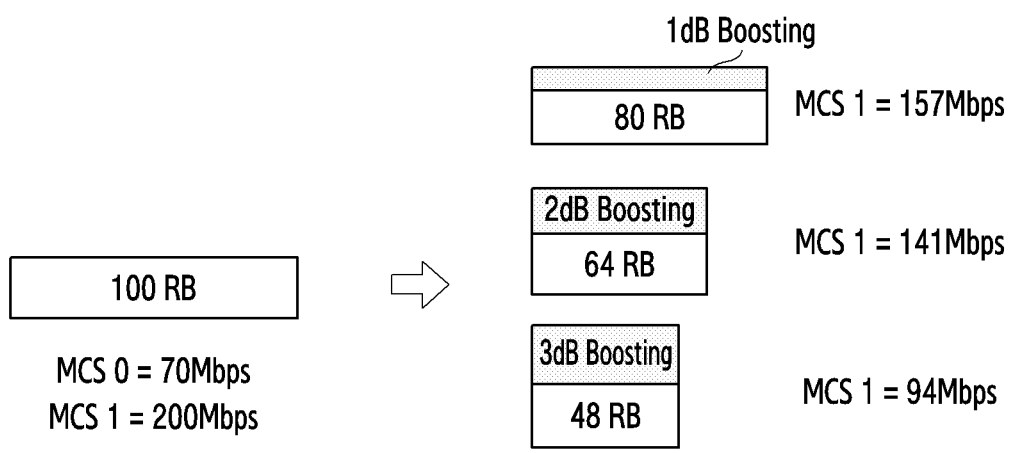
FIG. 8 is a view illustrating throughput-based scheduling according to various embodiments.

FIG. 8 is a view illustrating throughput-based scheduling according to various embodiments. The base station estimates the channel quality on the basis of the feedback information received from the terminal. Although the estimated channel quality has a value between a threshold channel quality value corresponding to an MCS level 0 and a threshold channel quality value corresponding to an MCS level 1, the base station may identify the MCS level 0. It is assumed that the size of the buffer usage (BO) for transmission is sufficient. In the example shown in FIG. 8, the scheduling may be performed on the basis of the table of MCS level-transport block size as follows.

TABLE 1

| MCS level, RB | 48 | 64 | 80 | 100 |
|---|---|---|---|---|
| MCS level 0 | 888 | 1184 | 1488 | 1864 |
| MCS level 1 | 2512 | 3360 | 4200 | 5256 |
| MCS level 2 | 4200 | 5608 | 7016 | 8776 |
| MCS level 3 | 6312 | 8424 | 10536 | 13176 |
| MCS level 4 | 8424 | 11240 | 14056 | 17576 |

Referring to FIG. 8, as a result of basic scheduling illustrated in a left side, the base station may identify the MCS level 0 as the first MCS level, and may obtain 100 RBs as the number of first resource blocks. In the case of the MCS level 0 and 100 RBs, the data rate may be 70 Mbps (megabit per second), and in the case of the MCS level of 1 and 100 RBs, the data rate may be 200 Mbps. The base station provides a data rate of 70 Mbps as a result 810 of basic scheduling without power boosting.

The base station may activate the power boosting mode. The base station may increase the size of a transport block transmitted per unit time (transport block size (TBS)) even if the number of allocated resource blocks is reduced through power boosting. That is, the base station may allocate, to the terminal, more resources than before the power boosting. The base station may obtain a result of throughput-based scheduling illustrated in a right side.

The base station may determine a required power boosting level (i.e., power boosting value) according to the size of the estimated channel quality. The base station may determine the number of resource blocks to be allocated according to the power boosting value. For example, the base station may perform power boosting of about 1 dB in order to identify the MCS level 1. At the MCS level 1, the base station may obtain 80 reduced from 100 as the number of resource blocks. The base station may provide a data rate of 157 Mbps through 80 resource blocks.

As another example, the base station may perform power boosting of about 2 dB in order to identify the MCS level 1. The base station may obtain 64 reduced from 100 as the number of resource blocks at the MCS level 1. The base station may provide a data rate of 141 Mbps using 64 resource blocks.

As another example, the base station may perform power boosting of about 3 dB in order to identify the MCS level 1. The base station may obtain 48 reduced from 100 as the number of resource blocks at the MCS level 1. The base station may provide a data rate of 94 Mbps using 48 resource blocks.

As described above, the base station may obtain a data rate of 94 Mbps, which is higher than the data rate of 70 Mbps obtained by performing only the basic scheduling, by performing the throughput-based scheduling based on the power boosting. The base station may increase the throughput, relative to the base scheduling, by increasing the MCS level through the power boosting, instead of determining always a low MCS level, thereby lowering the rate. An increase in the throughput means that the number of resources allocated during a unit time increases (that is, the data rate increases).

Figure 9:
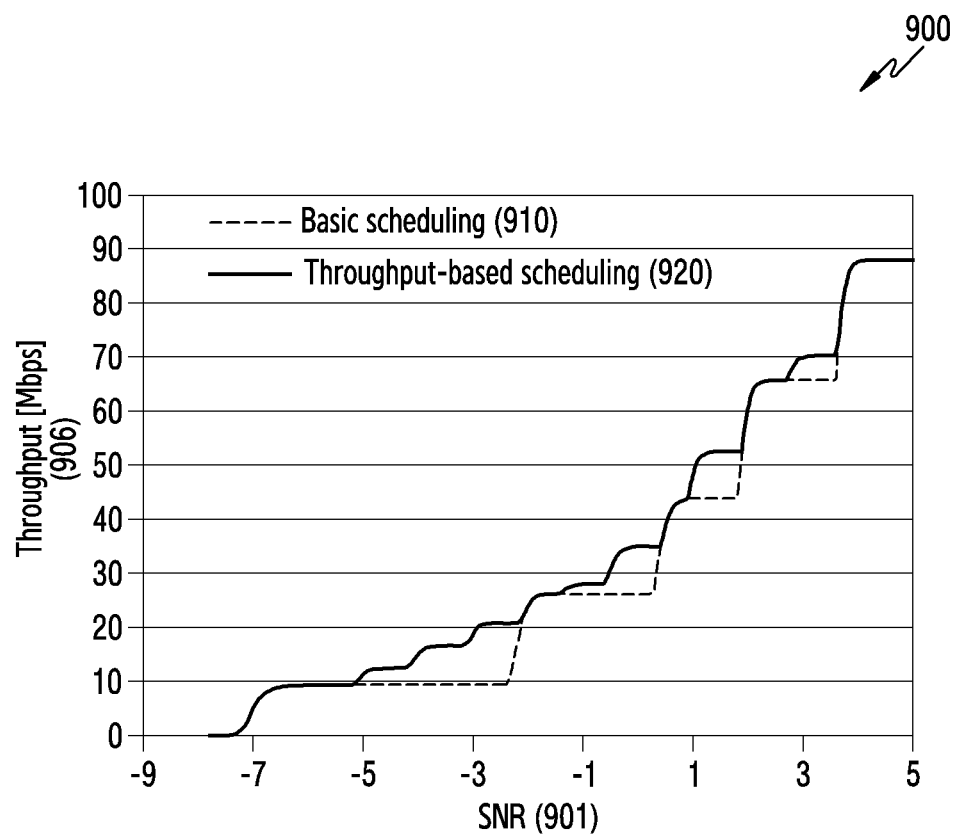
FIG. 9 is a graph illustrating performance of throughput-based scheduling according to various embodiments.

FIG. 9 is a graph illustrating the performance of throughput-based scheduling according to various embodiments.

Referring to FIG. 9, the horizontal axis 901 of a graph 900 represents the SNR, and the unit thereof is dB. Here, the SNR may be the channel quality corresponding to the MCS level of an embodiment. The higher the SNR value, the higher the MCS level. The vertical axis 906 represents throughput. The throughput indicates the number of bits transmitted per unit time, and the unit thereof is megabit per second (Mbps). Although the SNR is illustrated as the channel quality corresponding to the MCS level in FIG. 9, it is not limited thereto. The SINR or CINR, instead of SNR, may be used as a performance indicator.

A first dotted line 910 represents the throughput resulting from the scheduling in which power boosting is not performed (i.e., the basic scheduling). A second solid line 920 represents the throughput resulting from the scheduling in which power boosting is performed (i.e., the throughput-based scheduling).

In the case where the power boosting is not performed, if a channel quality lower than a threshold channel quality value corresponding to a specific MCS level (n) is obtained, the base station identifies an MCS level (n−1) lower than the specific MCS level and allocates resources of a transport block size corresponding thereto. The obtained channel quality is higher than the threshold channel quality value corresponding to the low MCS level. When performing power boosting, the base station may allocate resources of a medium transport block size between the transport block size that can be allocated at the higher MCS level (n) and the transport block size that can be allocated at the lower MCS level (n−1) by increasing the MCS level and reducing the number of allocated resource blocks.

The base station obtains a result of a scheduling scheme that provides higher throughput according to the throughput-based scheduling result. The base station may selectively obtain one of either the basic scheduling result or the boosting-based scheduling result. In the boosting-based scheduling, even if the channel quality obtained on the basis of feedback information of the terminal is lower than a threshold value of a specific MCS level, the specific MCS level may be determined. Even if a reduced number of resource blocks are allocated through boosting, the base station may provide the terminal with a higher data rate than the basic scheduling result through a higher MCS level.

The second line 920 provides a throughput that is always greater than or equal to that of the first line 910. In the sections where the second line 920 is positioned higher than the first line 910, it is possible to attain data rates higher than the first line 910 by performing power boosting-based scheduling.

Additionally, the application of the throughput-based scheduling of an embodiment showed that the throughput of the terminals located at the cell edge, to which a low MCS level is applied, increased 1.14 to 2.24 times. In SLS (system level simulation), the throughput of cell boundary terminals increased from 5% to 48% in a cell radius of 300 m. Specific simulation results are shown in the following table. The radius was set to 300 m.

TABLE 2

| | LinkAdaptation | Sector | Edge(5%) | Sector | Edge(5%) |
|---|---|---|---|---|---|
| 5G - 2T | No | 1985.1 | 5.3 | reference | reference |
| 5G - 4T | No | 2331.0 | 21.9 | reference | reference |
| 5G - 2T | Yes | 2029.4 | 7.8 | 2.23% | 48.00% |
| 5G - 4T | Yes | 2344.6 | 23.3 | 0.58% | 6.69% |

Here, "5G-2T" represents a simulation environment in which data is transmitted through two antennas in the pre-5G standard, and "5G-4T" represents a simulation environment in which data is transmitted through four antennas in the pre-5G standard. The sector represents the entire area, and the edge represents an area of 5% at the cell edge. "LinkAdaptation" indicates whether or not to perform throughput-based scheduling according to various embodiments.

Through power boosting according to various embodiments, the base station further increases the power per tone, thereby increasing throughput. Even if the estimated channel quality does not reach a threshold channel quality value of a specific MCS level, the base station can allocate a greater number of resources by reducing the number of resource blocks, instead of allocating resources of the transport block size corresponding to the low MCS level. As a result, the data rate of each terminal increases. In particular, when the modulation order or the code rate is low, the transport block size varies widely between the MCS levels, and thus the data rate of the terminal located at the cell boundary may be increased.

The throughput-based scheduling procedure of an embodiment can be applied to the case where resources are allocated to a plurality of terminals, as well as the case where resources are allocated to a single terminal during a unit time. In this case, the plurality of terminals may receive data through the same serving beam, or may receive data through different serving beams using a multi-beam.

Although the throughput-based scheduling procedure of an embodiment has been described on the basis of downlink transmission of a base station, it can also be applied to uplink transmission of a terminal. Based on the resource blocks allocated to the terminal by the base station and the MCS level, the terminal may perform throughput-based scheduling. In this case, a power boosting value applied to the terminal may be determined on the basis of uplink power control by the base station (e.g., power headroom, power headroom reporting, maximum power transmitted from the terminal, and transmission power control (TPC)). The terminal may perform the uplink physical channel processing according to the basic scheduling result, or may perform the uplink physical channel processing according to the boosting-based scheduling result.

An example of power boosting has been described to increase the MCS level in performing the throughput-based scheduling procedure of various embodiments. However, in addition to the power boosting, the base station or the terminal can increase the modulation order or the code rate of the data to be transmitted using other methods. According to an embodiment, the base station may increase the MCS level by utilizing the fact that gains vary depending on beam patterns. The beam pattern may include a beam width.

In the present disclosure, although the expression "equal to or more than" or "equal to or less than" is used in order to determine whether or not a specific condition is fulfilled, this is only an example and does not exclude the expression "more than" or "less than". The expression "equal to or more than" can be replaced with "more than", the expression "equal to or less than" can be replaced with "less than", and the expression "equal to or more than and less than" can be replaced with "more than and equal to or less than" in the conditions above.

Methods according to various embodiments may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments, a component is expressed in the singular or the plural according to a presented detailed embodiment. However, the singular form or plural form is selected for convenience of description suitable for the presented situation, and various embodiments are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. A method of operating a base station in a wireless communication system, the method comprising:
   receiving, from a terminal, channel quality information;
   obtaining a first modulation and coding scheme (MCS) level and a number of first resource blocks based on the received channel quality information;
   obtaining a number of second resource blocks based on a power boosting for a target channel quality of a second MCS level, wherein the second MCS level indicates at least one of a higher modulation order or a higher code rate than the first MCS level;
   transmitting, to the terminal, downlink data based on the second MCS level and the number of the second resource blocks, wherein a second transport block size (TBS) value corresponding to the number of the second resource blocks in the second MCS level is greater than a first TBS value corresponding to the number of the first resource blocks in the first MCS level.

2. The method of claim 1, further comprising:
   determining whether or not to activate a power boosting mode in which the power boosting is performed for scheduling to apply the second MCS level different from the first MCS level that corresponds to the channel quality information.

3. The method of claim 2, further comprising transmitting downlink data to the terminal on based on the first MCS level and the first resource blocks in response to the determining not to activate the power boosting mode.

4. The method of claim 2, wherein the determining whether or not to activate the power boosting mode further comprises determining whether or not to activate the power boosting mode based on at least one of:
   whether or not the first MCS level is equal to or less than an threshold MCS level value, or
   whether or not the number of the first resource blocks is equal to or more than a threshold resource block value.

5. The method of claim 2, wherein the determining of whether or not to activate the power boosting mode further comprises determining whether or not to activate the power boosting mode based on whether a type of the downlink data is an enhanced mobile broadband (eMBB) or ultra-reliable and low-latency communications (URLLC).

6. The method of claim 1, wherein the obtaining of the number of the second resource blocks further comprises:
   identifying a candidate for the number of the second resource blocks based on the number of the first resource blocks and a value of the power boosting; and
   obtaining the candidate as the number of the second resource blocks in response to identifying that the second TBS value corresponding to the candidate is greater than the first TBS value, and
   wherein the candidate provides a largest TBS within a range of resource blocks identified based on the number of the first resource blocks and the value of the power boosting.

7. The method of claim 1, further comprising:
   when it is not possible to obtain the number of the second resource blocks in which the second TBS value is greater than the first TBS value, transmitting downlink data to the terminal based on the first MCS level and the number of the first resource blocks.

8. The method of claim 1, wherein the channel quality information comprises at least one of a channel quality indicator (CQI) which is a measurement result of a signal transmitted from the base station or hybrid automatic repeat request (HARQ)-acknowledge (ACK) information for a downlink signal transmitted from the base station.

9. The method of claim 1, wherein a value of the power boosting is obtained based on a difference between a channel quality of the received channel quality information and to the target channel quality of the second MCS level.

10. An apparatus of a base station in a wireless communication system, the apparatus comprising:
    at least one transceiver; and
    at least one processor operatively connected to the at least one transceiver,
    wherein the at least one processor is configured to:
       control the at least one transceiver to receive, from a terminal, channel quality information;
       obtain a first modulation and coding scheme (MCS) level and a number of first resource blocks based on the channel quality information;
       obtain a number of second resource blocks based on a power boosting for a target channel quality of a second MCS level, wherein the second MCS level indicates at least one of a higher modulation order or a higher code rate than the first MCS level; and control the at least one transceiver to transmit, to the terminal, downlink data based on the second MCS level and the number of the second resource blocks, wherein a second transport block size (TBS) value corresponding to the number of the second resource blocks in the second MCS level is greater than a first TBS value corresponding to the number of the first resource blocks in the first MCS level.

11. The apparatus of claim 10, wherein the at least one processor is further configured to determine whether or not to activate a power boosting mode in which the power boosting is performed for scheduling to apply the second MCS level different from the first MCS level corresponding to the channel quality information received by the at least one transceiver.

12. The apparatus of claim 11, wherein the at least one processor is further configured to control the at least one transceiver to transmit, to the terminal, additional downlink data based on the first MCS level and the first resource blocks in response to the at least one processor determining not to activate the power boosting mode.

13. The apparatus of claim 11, wherein the at least one processor is configured to determine whether or not to activate the power boosting mode based on at least one of:

whether or not the first MCS level is equal to or less than a threshold MCS level value, or whether or not the number of the first resource blocks is equal to or more than a threshold resource block value.

14. The apparatus of claim 11, wherein the at least one processor is configured to determine whether or not to activate the power boosting mode based on whether a type of the downlink data to be transmitted is one of an enhanced mobile broadband (eMBB) and an ultra-reliable and low-latency communications (URLLC).

15. The apparatus of claim 10, wherein the at least one processor is further configured to:

identify a candidate for the number of the second resource blocks based on the number of the first resource blocks and a value of the power boosting; and obtain the candidate as the number of the second resource blocks in response to identifying that the second TBS value corresponding to the candidate is greater than the first TBS value, and wherein the candidate provides a largest TBS within a range of resource blocks identified based on the number of the first resource blocks and the value of the power boosting.

16. The apparatus of claim 10, wherein the at least one processor is further configured to, if it is not possible to obtain the number of the second resource blocks in which the second TBS value is greater than the first TBS value, transmit, to the terminal, downlink data based on the first MCS level and the number of the first resource blocks.

17. The apparatus of claim 10, wherein the channel quality information comprises at least one of a channel quality indicator (CQI) which is a measurement result of a first signal transmitted from the base station and hybrid automatic repeat request (HARQ)-acknowledge (ACK) information for a second signal transmitted from the base station.

18. The apparatus of claim 10, wherein a value of the power boosting is obtained based on a difference between a channel quality of the received channel quality information and the target channel quality of the second MCS level.

* * * * *